(12) United States Patent
Ito et al.

(10) Patent No.: US 12,460,927 B2
(45) Date of Patent: Nov. 4, 2025

(54) ESTIMATION DEVICE, ESTIMATION METHOD, AND NON-TRANSITORY COMPUTER-READABLE RECORDING MEDIUM FOR THICKNESS OF PRECIPITATE

(71) Applicant: YOKOGAWA ELECTRIC CORPORATION, Tokyo (JP)

(72) Inventors: Shumpei Ito, Tokyo (JP); Yoshiaki Tanaka, Tokyo (JP); Tatsuya Hazuku, Tokyo (JP); Motoaki Morita, Tokyo (JP); Tomonori Ihara, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 494 days.

(21) Appl. No.: 17/960,274

(22) Filed: Oct. 5, 2022

(65) Prior Publication Data

US 2023/0104465 A1 Apr. 6, 2023

(30) Foreign Application Priority Data

Oct. 6, 2021 (JP) ................. 2021-164834

(51) Int. Cl.
*G01B 21/08* (2006.01)
*G01B 13/06* (2006.01)

(52) U.S. Cl.
CPC ............ *G01B 21/085* (2013.01); *G01B 13/06* (2013.01)

(58) Field of Classification Search
CPC ................. G01B 21/085; G01B 13/06
(Continued)

(56) References Cited

U.S. PATENT DOCUMENTS 6,886,393 B1 * 5/2005 Romanet ............. G01B 21/085
73/61.62
8,960,305 B2 2/2015 McCann et al.
(Continued)

FOREIGN PATENT DOCUMENTS

JP 2019-133596 A 8/2019
JP 2021-518905 A 8/2021
(Continued)

OTHER PUBLICATIONS

Office Action issued in counterpart Japanese Patent Application JP 2021-164834 mailed Jun. 6, 2023 (6 pages).
(Continued)

*Primary Examiner* — Mirellys Jagan
(74) *Attorney, Agent, or Firm* — Osha Bergman Watanabe & Burton LLP (57) ABSTRACT

An estimation device includes a controller that: acquires a first pipe surface temperature and a second pipe surface temperature, wherein the first pipe surface temperature is an outer surface temperature of a pipe at a precipitate generation position at which a precipitate is adhered to an inner surface of the pipe through which a fluid flows, and the second pipe surface temperature is the outer surface temperature of the pipe at a reference position different from the precipitate generation position; calculates an in-pipe fluid temperature that is a temperature of the fluid at the precipitate generation position based on the second pipe surface temperature; and estimates a thickness of the precipitate based on the in-pipe fluid temperature and the first pipe surface temperature.

17 Claims, 6 Drawing Sheets

(58) Field of Classification Search
USPC .................................................. 374/7, 147
See application file for complete search history.

(56) References Cited

U.S. PATENT DOCUMENTS

| | | |
|---|---|---|
| 2004/0059505 A1 | 3/2004 | Gallagher |
| 2020/0348131 A1 | 11/2020 | Taniguchi et al. |
| 2021/0108917 A1 | 4/2021 | Hazuku et al. |
| 2021/0301625 A1 | 9/2021 | Ito et al. |

FOREIGN PATENT DOCUMENTS

| | | | | |
|---|---|---|---|---|
| NO | 332832 B1 | * | 1/2013 | ........... G01B 21/085 |
| RU | 2700349 C1 | * | 9/2019 | |
| WO | 2019/182882 A1 | | 9/2019 | |

OTHER PUBLICATIONS

Extended European Search Report issued in corresponding European Patent Application No. 22199893.3, dated Feb. 8, 2023 (7 pages).

* cited by examiner

ESTIMATION DEVICE, ESTIMATION METHOD, AND NON-TRANSITORY COMPUTER-READABLE RECORDING MEDIUM FOR THICKNESS OF PRECIPITATE

CROSS-REFERENCE TO RELATED APPLICATION

The present application claims priority from Japanese Patent Application No. 2021-164834 filed in Japan on Oct. 6, 2021, the contents of which are incorporated herein by reference in their entirety.

BACKGROUND

Technical Field

The present invention relates to an estimation device, an estimation method, and a non-transitory computer-readable recording medium for a thickness of a precipitate.

Description of the Related Art

Conventionally, in a pipeline that is used for oil or gas, precipitates, such as hydrate, wax, asphaltene, or scale, are generated depending on a condition, such as temperature or pressure. Because of this, a coping technique for removing these types of precipitates is adopted by using a technique for adding a medical agent called an inhibitor that decreases generation of these types of precipitates, a technique for inserting a tool called a pig into a pipeline, or the like. However, under the current circumstances, there is no means to measure the generation thickness of these precipitates (hereinafter, appropriately referred to as a "precipitate thickness"), so that the coping technique is not able to be optimally utilized at the moment by using the inhibitor, the pig, or the like.

Thus, there are demands for technologies for estimating a precipitate thickness of a precipitate generated inside a pipe, and, as examples of the technologies, Japanese Laid-open Patent Publication No. 2019-133596, U.S. Patent Application Publication 2004/0059505, U.S. Pat. No. 8,960,305 and the like are disclosed.

However, with the technologies described above, it is difficult to estimate a precipitate thickness of a precipitate inside the pipe with accuracy. First, Japanese Laid-open Patent Publication No. 2019-133596 discloses a technology for estimating a shape of a precipitate from a plurality of temperature sensors that are installed on the surface of a pipe around the circumference, and, with this technology, it is not able to estimate a shape of a precipitate with accuracy unless temperatures of fluids inside and outside of the pipe are able to be estimated or measured with accuracy. For example, if the estimated values of the fluid temperatures inside and outside the pipe are incorrect, with this technique, the shape of a precipitate is erroneously estimated thicker or thinner than in reality.

In addition, in Japanese Laid-open Patent Publication No. 2019-133596, if the fluid temperatures are obtained from an experience, an analysis of a flow simulator, or the like, obtained values may possibly be greatly different from the actual values. If these values are estimated on the basis of past measurement results, a difference between the estimated value and the actual value is increased over time due to a phenomenon, such as a change in temperatures inside and outside the pipe over time.

U.S. Patent Application Publication 2004/0059505 discloses a technology for monitoring a precipitate by measuring a pipe surface temperature of a pipeline that is used for oil or gas by using an array temperature sensor, and, with this technology, it is not able to estimate a precipitate shape with accuracy unless the temperatures of the fluids inside and outside the pipe are able to be estimated or measured with accuracy.

U.S. Pat. No. 8,960,305 discloses a technology for monitoring the overall state of a pipeline by measuring a temperature, a vibration, pressure, and a distortion distribution in a pipe axial direction of the pipeline by using a distributed temperature sensor (DTS) and performing calibration on a model, such as a flow assurance simulator, of the pipeline. In this technology, it is not able to estimate a fluid temperature inside the pipe, so that it is not able to estimate a precipitate thickness of a precipitate with accuracy. As described above, there is a demand for an estimation device that is able to estimate a precipitate thickness of a precipitate inside a pipe with accuracy.

SUMMARY

One or more embodiments provide an improvement over conventional technologies by allowing accurate estimations to be made of a precipitate thickness inside a pipe. According to one or more embodiments, an estimation device includes, an acquisition unit (a controller) that acquires a first pipe surface temperature that is an outer surface temperature of a pipe at a precipitate generation position at which a precipitate is adhered to an inner surface of the pipe through which a fluid flows and a second pipe surface temperature that is an outer surface temperature of the pipe at a reference position that is different from the precipitate generation position, a calculation unit (the controller) that calculates an in-pipe fluid temperature that is a temperature of the fluid at the precipitate generation position based on the second pipe surface temperature, and an estimation unit (the controller) that estimates information on a thickness of the precipitate based on the in-pipe fluid temperature and the first pipe surface temperature.

According to one or more embodiments, an estimation method includes, acquiring a first pipe surface temperature that is an outer surface temperature of a pipe at a precipitate generation position at which a precipitate is adhered to an inner surface of the pipe through which a fluid flows and a second pipe surface temperature that is an outer surface temperature of the pipe at a reference position that is different from the precipitate generation position, calculating an in-pipe fluid temperature that is a temperature of the fluid at the precipitate generation position based on the second pipe surface temperature, and estimating information on a thickness of the precipitate based on the in-pipe fluid temperature and the first pipe surface temperature.

According to one or more embodiments, a non-transitory computer-readable recording medium stores therein estimation instructions that cause a computer to execute a process including, acquiring a first pipe surface temperature that is an outer surface temperature of a pipe at a precipitate generation position at which a precipitate is adhered to an inner surface of the pipe through which a fluid flows and a second pipe surface temperature that is an outer surface temperature of the pipe at a reference position that is different from the precipitate generation position, calculating an in-pipe fluid temperature that is a temperature of the fluid at the precipitate generation position based on the second pipe surface temperature, and estimating information on a thickness of the precipitate based on the in-pipe fluid temperature and the first pipe surface temperature.

DETAILED DESCRIPTION

Embodiments of an estimation device, an estimation method, and a non-transitory computer-readable recording medium disclosed in the present invention will be explained in detail below with reference to the accompanying drawings. Furthermore, the present invention is not limited to the embodiments.

In the following, a configuration of an estimation system 100 according to one or more embodiments, a configuration of an estimation device 10 or the like according to one or more embodiments, the flow of each of processes, and specific examples of a pipe and temperature sensors will be described in this order and, at the end, effects of one or more embodiments will be described.

Configuration of the Estimation System 100

Figure 1:
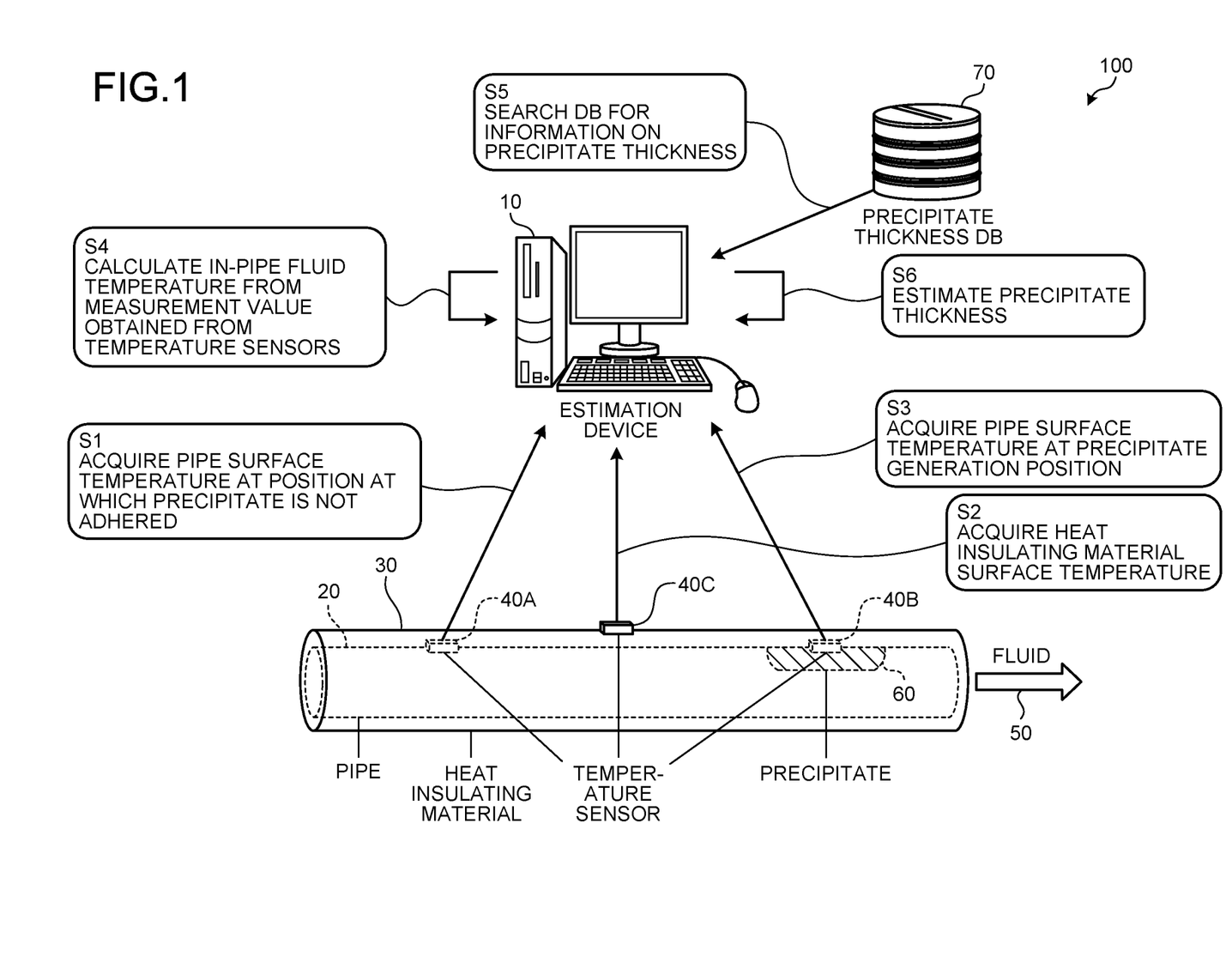
FIG. 1 is a diagram illustrating a configuration example of an estimation system according to one or more embodiments.

A configuration of the estimation system 100 (hereinafter, also appropriately referred to as the "system") according to one or more embodiments will be described in detail with reference to FIG. 1. FIG. 1 is a diagram illustrating a configuration example of an estimation system according to one or more embodiments. In the following, a configuration example of the entire of the estimation system 100 is described, and then, processes performed by the present estimation system 100 will be described. Furthermore, in one or more embodiments, a description will be made by using a pipeline that is used for oil or a gas as an example; however, the example is not limited to this, and it may be possible to use a pipe through which various kinds of fluid flows, including a pipe that guides a coolant to an electrical power plant, a pipe that guides hot spring water to a predetermined location, or the like.

Configuration Example of Entire System

The estimation system 100 includes the estimation device 10, temperature sensors 40 (40A, 40B, and 40C), and a precipitate thickness database (DB) 70. Here, the estimation device 10, the temperature sensors 40, and the precipitate thickness DB 70 are connected via a predetermined communication network (not illustrated) so as to be able to communicate each other in a wired or wireless manner. Furthermore, in the estimation system 100 illustrated in FIG. 1, a plurality of the estimation devices 10 and a plurality of the precipitate thickness DBs 70 may be included.

Here, the temperature sensors 40 are installed on an outer surface of a pipe 20 of a pipeline that is used for oil or gas and an outer surface of a heat insulating material 30 that covers the pipe 20. Furthermore, a fluid 50, such as oil or gas, flows through the pipe 20. In addition, a precipitate 60, such as hydrate, wax, asphaltene, or scale, is generated on an inner surface of the pipe 20.

Process of Entire System

An example in which a precipitate thickness of a precipitate generated inside the pipe is estimated in the system described above will be described. First, the estimation device 10 acquires, from the temperature sensor 40A, a pipe surface temperature that is a temperature of an outer surface at a position that is associated with a position at which the precipitate 60 is not adhered to an inner surface of the pipe 20 (hereinafter, appropriately referred to as a "reference position") (Step S1). Furthermore, the estimation device 10 acquires, from the temperature sensor 40C, a heat insulating material surface temperature that is a temperature of an outer surface of the heat insulating material 30 (Step S2). In addition, the estimation device 10 acquires, from the temperature sensor 40B, a pipe surface temperature that is a temperature of an outer surface at a position that is associated with a position at which the precipitate 60 is adhered to the inner surface of the pipe 20 (hereinafter, appropriately referred to as a "precipitate generation position") (Step S3).

Here, examples of the temperature sensors 40 (40A, 40B, and 40C) include a thermocouple, a resistance temperature detector, a DTS, a thermal camera, or the like. The temperature sensor 40A measures a pipe surface temperature at the reference position. The temperature sensor 40B measures a pipe surface temperature at the precipitate generation position. The temperature sensor 40C measures a surface temperature of the heat insulating material 30. In FIG. 1, each of the temperature sensors 40A, 40B, and 40C is installed at a single position; however, a plurality of temperature sensors may be installed in the entirety of the pipe or the entirety of the heat insulating material.

Then, the estimation device 10 uses the measurement values acquired from the temperature sensors 40, and calculates a temperature of the fluid 50 flowing through the precipitate generation position (hereinafter, appropriately referred to as an "in-pipe fluid temperature") (Step S4). Furthermore, a calculation process for calculating the in-pipe fluid temperature will be described (in the flow of a fluid temperature calculation process) in detail later.

After that, the estimation device 10 searches the precipitate thickness DB 70 for information on a precipitate thickness stored in the precipitate thickness DB 70 on the basis of the calculated in-pipe fluid temperature (Step S5), and estimates a precipitate thickness (Step S6). Furthermore, an estimation process for estimating the precipitate thickness will be described (in the flow of a precipitate thickness estimation process) in detail later.

By performing the processes at Steps S1 to S6 described above, it is possible to estimate the thickness of a precipitate generated inside the pipeline without measuring the fluid temperature in the pipeline that is used for oil or gas.

Configuration of Estimation Device 10, Etc.

Figure 2:
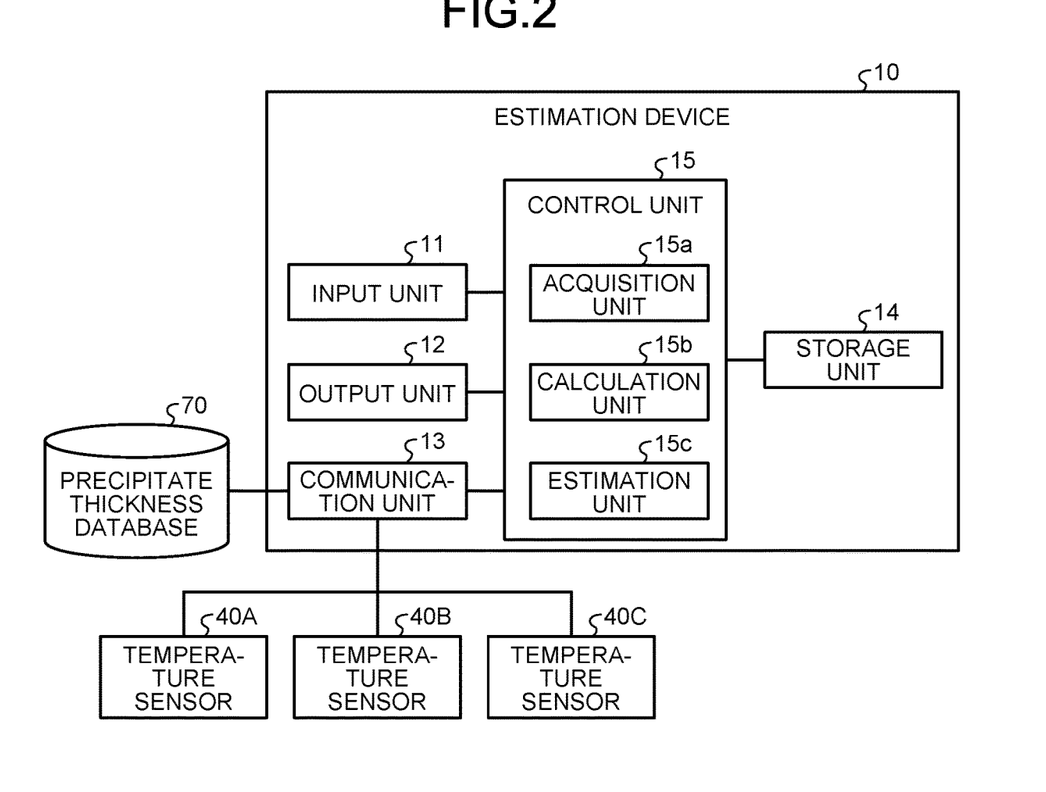
FIG. 2 is a block diagram illustrating a configuration example of the estimation system according to one or more embodiments.

A functional configuration of each of the devices included in the estimation system 100 illustrated in FIG. 1 will be described with reference to FIG. 2. FIG. 2 is a block diagram illustrating a configuration example of the estimation system according to one or more embodiments. In the following, a configuration of the estimation device 10, a configuration of the temperature sensors 40, and a configuration of the precipitate thickness database (DB) 70 according to one or more embodiments will be described in this order.

Configuration of Estimation Device 10

The estimation device 10 includes an input unit 11, an output unit 12, a communication unit 13, a storage unit 14, and a control unit (a controller) 15. The input unit 11 manages an input of various kinds of information with respect to the estimation device 10. For example, the input unit 11 is implemented by a mouse, a keyboard, or the like, and receives an input of set information or the like with respect to the estimation device 10. Furthermore, the output unit 12 manages an output of various kinds of information received from the estimation device 10. For example, the output unit 12 is implemented by a display, or the like, and outputs the set information or the like stored in the estimation device 10.

The communication unit 13 manages data communication with the other devices. For example, the communication unit 13 performs data communication with each of the devices via a network device that is not illustrated. Furthermore, the communication unit 13 is able to perform data communication with a terminal that is not illustrated and that is used by an operator.

The storage unit 14 stores therein various kinds of information that is referred when the control unit 15 is operated and various kinds of information that is acquired when the control unit 15 has been operated. Here, the storage unit 14 may be implemented by, for example, a semiconductor memory device, such as a random access memory (RAM) or a flash memory, or a storage device, such as a hard disk or an optical disk. Furthermore, in the example illustrated in FIG. 2, the storage unit 14 is installed in the estimation device 10; however, the storage unit 14 may be installed outside the estimation device 10, or a plurality of storage units may be installed.

Here, the storage unit 14 stores therein information that is used for the fluid temperature calculation process performed by a calculation unit 15b. For example, the storage unit 14 stores therein pieces of thermal conductivity $k_p$ and $k_i$ of the pipe and the heat insulating material, respectively, an outer radius $r_{p2}$ of the pipe (i.e., an inner radius of the heat insulating material), an inner radius $r_{p1}$ of the pipe, and an outer radius $r_1$ of the heat insulating material. Furthermore, the storage unit 14 stores therein a diameter of the pipe, a flow velocity of the fluid inside the pipe, the quality of the heat insulating material, a thickness of the heat insulating material, an ambient air temperature, presence or absence of wind, disposition of the temperature sensors 40, the structure of the pipe, and the like.

The control unit 15 manages the overall control of the estimation device 10. The control unit 15 includes an acquisition unit 15a, the calculation unit 15b, and an estimation unit 15c. Here, the control unit 15 may be implemented by, for example, an electronic circuit, such as a central processing unit (CPU) or a micro processing unit (MPU), or an integrated circuit, such as an application specific integrated circuit (ASIC) or a field programmable gate array (FPGA).

The acquisition unit 15a acquires a pipe surface temperature that is an outer surface temperature of the pipe 20 at the precipitate generation position at which the precipitate 60 is adhered to the inner surface of the pipe 20 through which the fluid 50 flows (a first pipe surface temperature), and acquires a pipe surface temperature that is an outer surface temperature of the pipe 20 at the reference position that is different from the precipitate generation position (a second pipe surface temperature).

For example, the acquisition unit 15a acquires, as the pipe surface temperature associated with the reference position, the outer surface temperature of the pipe 20 at the reference position at which a precipitate is not adhered to the inner surface. Furthermore, the acquisition unit 15a acquires, as the pipe surface temperature associated with the reference position, the outer surface temperature of the pipe 20 at the reference position at which a precipitate is adhered to the inner surface. In addition, the acquisition unit 15a acquires the heat insulating material surface temperature that is the outer surface temperature of the heat insulating material 30 that covers the pipe 20.

In the case of the example described above, in a pipe (pipeline) that transports oil or gas produced from a winze, the acquisition unit 15a acquires the pipe surface temperature that is associated with the reference position and that is measured by the temperature sensor 40A, and acquires the pipe surface temperature that is associated with the precipitate generation position and that is measured by the temperature sensor 40B. In contrast, the process performed by the acquisition unit 15a is not limited to the example described above, and, for example, in a pipe that transports a coolant to an electrical power plant, in a pipe that transports hot spring water to a predetermined location, or the like, the acquisition unit 15a is also able to acquire the pipe surface temperature at the reference position and the pipe surface temperature at the precipitate generation position.

The calculation unit 15b calculates an in-pipe fluid temperature that is the temperature of the fluid 50 at the precipitate generation position on the basis of the pipe surface temperature that is associated with the reference position and that is acquired by the acquisition unit 15a. For example, the calculation unit 15b uses the second pipe surface temperature, the heat insulating material surface temperature, and thermal resistance of each of the fluid, the pipe, and the heat insulating material, and calculates the in-pipe fluid temperature.

In the case of the example described above, the calculation unit 15b calculates the in-pipe fluid temperature of the oil or the gas produced from the winze on the basis of the pipe surface temperature at the reference position measured by the temperature sensor 40A. In contrast, the process performed by the calculation unit 15b is not limited to the example described above, and, for example, the calculation unit 15b is also able to calculate the in-pipe fluid temperature of a coolant transported to an electrical power plant, or calculate the in-pipe fluid temperature of hot spring water transported to a predetermined location.

In addition, the calculation unit 15b calculates a temperature difference between the fluid 50 flowing through the reference position and the fluid 50 flowing through the precipitate generation position by using the temperature of the fluid 50 flowing through the precipitate generation position in a state in which the precipitate 60 is not adhered, a flow velocity of the fluid 50 inside the pipe 20, and a distance between the reference position and the precipitate generation position, and calculates the in-pipe fluid temperature by using the temperature difference.

In other words, if a distance between the temperature sensor 40B that is used to detect generation of a precipitate and the temperature sensor 40A that is used to estimate the in-pipe fluid temperature is large, the fluid temperature at each of the two positions may sometimes be different; however, the calculation unit 15b is able to estimate, with more accuracy, the fluid temperature at the precipitate generation position by correcting the fluid temperature by using a prediction value the temperature difference between the two positions, a measurement value, or the like.

For example, the calculation unit 15b is able to obtain a fluid temperature difference between the two positions by acquiring, in advance, both of the temperatures at the stage in which a precipitate is not adhered to both of the two positions (i.e., the positions of the temperature sensor 40A and the temperature sensor 40B). Furthermore, the calculation unit 15b is able to obtain a temperature difference between the two positions from the distance between the two positions that is calculated from an amount of change in fluid temperature per length on the basis of the diameter of the pipe, the flow velocity of the fluid inside the pipe, the quality of the heat insulating material, the thickness of the heat insulating material, the ambient air temperature, presence or absence of wind, or the like. In addition, the calculation unit 15b may refer to the above described information needed for the calculation stored in the storage unit 14 and use the information to perform the calculation process.

Furthermore, the calculation unit 15b is also able to correct the fluid temperature at the precipitate generation position by using the information obtained at the measurement time by the temperature sensor 40 in a manner described below. Namely, if the distance between the two measurement positions is small, the calculation unit 15b may perform the calculation process by using all of the measurement values that are acquired by the temperature sensors 40 using wire communication or the like as the pieces of information obtained at the same time; however, if the distance between the two measurement positions is large, the calculation unit 15b is also able to perform the calculation process by using the information on the measurement time and the information on the measurement values of the temperatures acquired at the respective positions by using wireless communication or the like.

First, after the acquisition unit 15a acquires the measurement values and the measurement time, the calculation unit 15b may calculate a fluid temperature from the pipe surface temperature at a point, in which a precipitate is not adhered, at a certain time, and may use the calculated fluid temperature for the estimation process for estimating a precipitate thickness at a precipitate thickness estimation position that is obtained at the certain time.

In contrast, instead of using the certain time, the calculation unit 15b may calculate a period of time needed for the fluid to flow from a point at which a precipitate is not adhered to the position of the precipitate thickness estimation position on the basis of the flow velocity inside the pipe and the distance between the two positions, and may use the fluid temperature, which is obtained before the calculated period of time needed for the fluid to flow, in order to estimate the precipitate thickness. This example is used in a case where the position at which a precipitate is not adhered is located on the upstream of the precipitate thickness estimation position, and, in contrast, in a case where the subject position is located on the downstream of the precipitate thickness estimation position, the calculation unit 15b may use the fluid temperature that is obtained at the time before a period of time needed for the fluid to flow. Furthermore, the calculation unit 15b may refer to the disposition of the temperature measurement position, the structure of the pipeline, the information on the fluid, such as the flow velocity, stored in the storage unit 14, and may calculate a temporal difference.

Furthermore, if a pipe surface temperature is acquired from a plurality of reference positions, the calculation unit 15b calculates an in-pipe fluid temperature on the basis of the pipe surface temperature acquired from the reference position at which the highest outer surface temperature is indicated. In other words, if a point at which a precipitate is not adhered is unclear, for example, if it is expected that a precipitate is not adhered to all of the surface but is adhered to a part of the surface, but it is not able to specify the adhesion position, the calculation unit 15b is able to acquire, by disposing the temperature sensors 40 at a lot of locations at intervals, information on each of the temperatures and the measurement time by using wireless communication or the like and perform the calculation process.

For example, if each of the measurement positions is close each other and a difference between the fluid temperatures at the respective positions is small, the calculation unit 15b is able to determine that a precipitate is not adhered to a point at which the pipe surface temperature is higher than the other points, calculate a fluid temperature from the measurement temperature at that point, and use the calculated fluid temperature in order to estimate the thickness of the precipitate at the other position.

The estimation unit 15c estimates the information on the thickness of the precipitate 60 on the basis of the in-pipe fluid temperature and the pipe surface temperature that is associated with the precipitate generation position. For example, the estimation unit 15c uses the in-pipe fluid temperature and a thickness distribution for each of precipitates associated with the pipe surface temperatures, and estimates the thickness of the precipitate 60 at the precipitate generation position.

Here, a method for estimating a precipitate thickness performed on the basis of the measurement value of the outer surface temperature of the pipe is disclosed in Japanese Laid-open Patent Publication No. 2019-133596. In addition, a method for estimating a thickness of the precipitate 60 performed by the estimation unit 15c on the basis of the measurement value of the outer surface temperature of the pipe 20 is not limited to the method disclosed in Japanese Laid-open Patent Publication No. 2019-133596 described above. For example, in Japanese Laid-open Patent Publication No. 2019-133596 described above, a precipitate thickness distribution obtained at a fluid temperature and an external air temperature (outside air temperature) is used; however, instead of the outside air temperature, it may be possible to use a precipitate thickness distribution obtained at a heat insulating material surface temperature.

Furthermore, the estimation unit 15c estimates a thickness of the precipitate 60 at the precipitate generation position as the information on the thickness of the precipitate 60. In addition, the estimation unit 15c estimates a difference between the thickness of the precipitate at the reference position and the thickness of the precipitate at the precipitate generation position as the information on the thickness of the precipitate 60. Furthermore, the estimation unit 15c estimates the information on the thickness of hydrate, wax, asphaltene, or scale on the basis of the in-pipe fluid temperature and the pipe surface temperature that is associated with the precipitate generation position.

Configuration of Temperature Sensors 40

Each of the temperature sensors 40 (40A, 40B, and 40C) includes a functioning unit, such as a measuring unit (not illustrated) that measures a temperature, a transmission/reception unit (not illustrated) that manages transmission and reception of various kinds of data to and from the other device.

The measuring unit included in the temperature sensor 40A measures the second pipe surface temperature that is the outer surface temperature of the reference position at which the precipitate 60 is not precipitated in the pipe 20. Furthermore, the measuring unit included in the temperature sensor 40C measures the heat insulating material surface temperature that is the outer surface temperature of the heat insulating material 30. In addition, the measuring unit included in the temperature sensor 40B measures the first pipe surface temperature that is the outer surface temperature of the precipitate generation position at which the precipitate 60 is precipitated in the pipe 20.

The transmission/reception unit included in the temperature sensor 40A transmits the measured second pipe surface temperature to the estimation device 10. Furthermore, the transmission/reception unit included in the temperature sensor 40C transmits the measured heat insulating material surface temperature to the estimation device 10. In addition, the transmission/reception unit included in the temperature sensor 40B transmits the measured first pipe surface temperature to the estimation device 10.

Configuration of Precipitate Thickness Database 70

The precipitate thickness database (DB) 70 is a database that stores therein, in an associated manner for each of the types of the precipitate 60, a surface temperature distribution of the pipe in a circumferential direction and a precipitate thickness distribution that is a thickness distribution of a precipitate in a circumferential direction. The precipitate thickness DB 70 may be generated by performing a computer simulation, or may be generated from actual measurement values that are accumulated in advance.

The precipitate thickness DB 70 stores therein, as the surface temperature distribution of the pipe in the circumferential direction, a graph that indicates a relationship between a surface temperature and an outer circumference position. For example, the precipitate thickness DB 70 stores therein the fluid temperature of 100° C. in the case where the precipitate is wax and stores therein a plurality of surface temperature distributions of the pipe 20 at the outside air temperature of 20° C. In addition, the precipitate thickness DB 70 stores therein, as the precipitate thickness distribution, a graph that indicates a relationship between a thickness of a precipitate adhered in the pipe and an outer circumference position. In other words, the precipitate thickness DB 70 stores therein data on the precipitate thickness distribution associated with each of the plurality of surface temperature distributions that are obtained by using the fluid temperature and the outside air temperature as parameters.

Flow of Each Process

In the following, the flow of each of the processes according to one or more embodiments will be described by using FIG. 3 to FIG. 6. In a description below, the flow of the entire process, the flow of the temperature acquisition process, the flow of the fluid temperature calculation process, and the flow of the precipitate thickness estimation process according to one or more embodiments will be described in this order.

1. Flow of Entire Process

Figure 3:
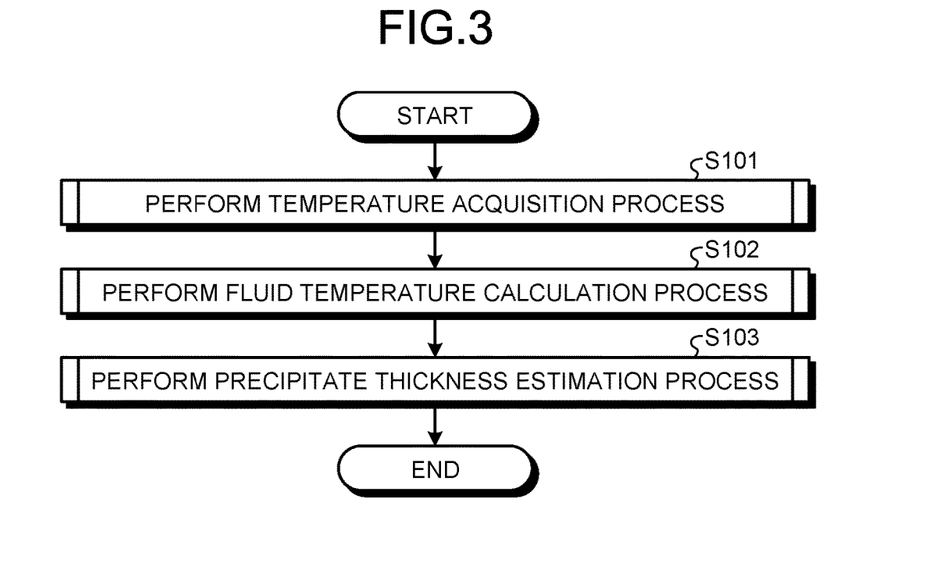
FIG. 3 is a flowchart illustrating an example of the flow of the entire process according to one or more embodiments.

The flow of the entire process according to one or more embodiments will be described with reference to FIG. 3. FIG. 3 is a flowchart illustrating an example of the flow of the entire process according to one or more embodiments. First, the acquisition unit 15a included in the estimation device 10 performs the temperature acquisition process (Step S101). Then, the calculation unit 15b included in the estimation device 10 performs the fluid temperature calculation process (Step S102). Then, the estimation unit 15c included in the estimation device 10 performs the precipitate thickness estimation process (Step S103), and ends the process.

2. Flow of Temperature Acquisition Process

Figure 4:
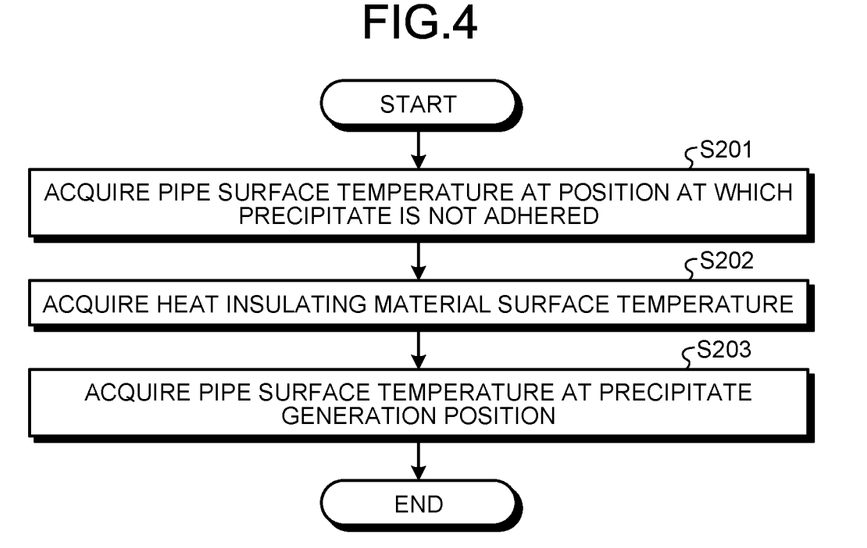
FIG. 4 is a flowchart illustrating an example of the flow of a temperature acquisition process according to one or more embodiments.

The flow of the temperature acquisition process according to one or more embodiments will be described with reference to FIG. 4. FIG. 4 is a flowchart illustrating an example of the flow of the temperature acquisition process according to one or more embodiments. First, the acquisition unit 15a included in the estimation device 10 acquires, from the temperature sensor 40A, the outer surface temperature (the second pipe surface temperature) at the reference position at which the precipitate 60 is not precipitated in the pipe 20 (Step S201). Then, the acquisition unit 15a acquires the outer surface temperature (the heat insulating material surface temperature) of the heat insulating material 30 from the temperature sensor 40C (Step S202). Then, the acquisition unit 15a acquires, from the temperature sensor 40B, the outer surface temperature (the first pipe surface temperature) at the precipitate generation position at which the precipitate 60 is precipitated in the pipe 20 (Step S203).

The acquisition unit 15a performs the processes at Steps S201 to S203 described above and ends the temperature acquisition process. Furthermore, the order of the processes performed at Steps S201 to S203 and the timing at which each of the processes is performed are able to be dynamically or statically changed. In addition, of the processes performed at Steps S201 to S203, some process may be omitted.

3. Flow of Fluid Temperature Calculation Process

Figure 5:
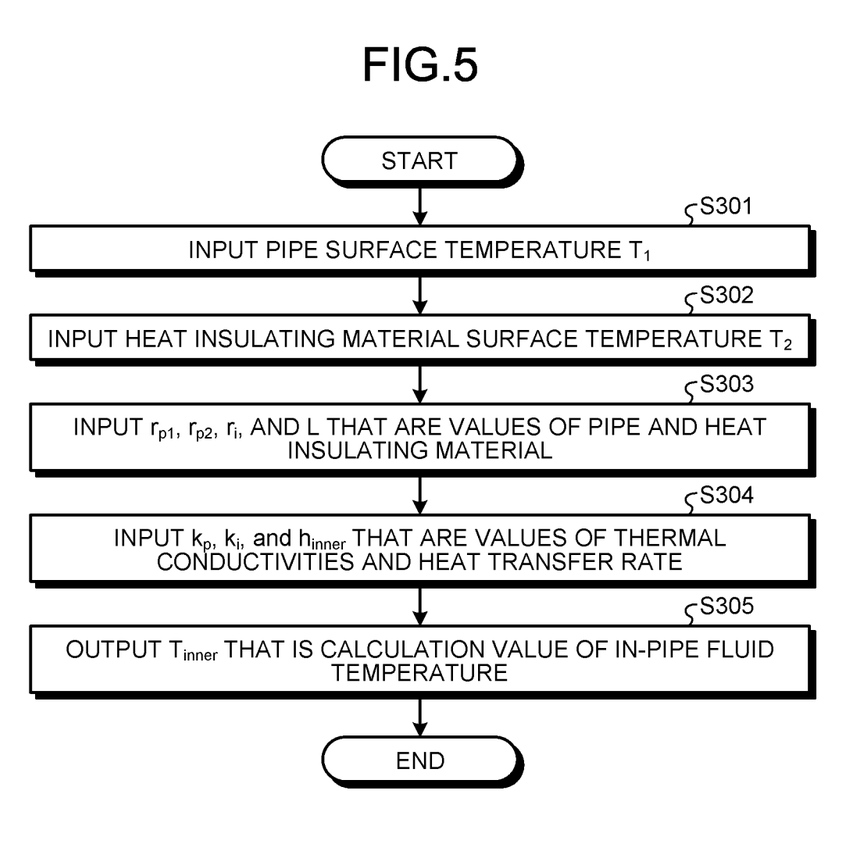
FIG. 5 is a flowchart illustrating an example of the flow of a fluid temperature calculation process according to one or more embodiments.

The flow of the fluid temperature calculation process according to one or more embodiments will be described with reference to FIG. 5. FIG. 5 is a flowchart illustrating an example of the flow of the fluid temperature calculation process according to one or more embodiments. In a description below, a method for calculating a fluid temperature according to one or more embodiments will be described by using mathematical formulas, and then, the flow of the fluid temperature calculation process according to one or more embodiments will be described in detail.

Method for Calculating Fluid Temperature

In the following, an example of a technique for estimating an in-pipe fluid temperature from a pipe surface temperature at a point at which a precipitate is not adhered will be indicated. First, it is assumed that a pipe surface temperature of a point at which a precipitate is not adhered and a heat insulating material surface temperature are measured. If a temperature of the pipe surface is denoted by $T_1$, a heat insulating material surface temperature is denoted by $T_2$, and an in-pipe fluid temperature is denoted by $T_{inner}$ a heat transfer amount Q of a fluid from inside the pipe to an external portion of the pipe is represented by Equation (1) below by considering a transfer of the heat of the fluid inside the pipe to the pipe surface.

$$Q = \frac{T_{inner} - T_1}{R_{pipe} + R_{inner}} \quad (1)$$

In addition, by considering a transfer of the heat from the pipe surface to the heat insulating material surface, regarding the heat transfer amount Q, a relation represented by Equation (2) is obtained.

$$Q = \frac{T_1 - T_2}{R_{insulation}} \quad (2)$$

where, $R_{pipe}$ and $R_{insulation}$ denote the thermal resistance of the pipe and the heat insulating material, respectively, and $R_{inner}$ denotes the thermal resistance of the fluid inside the pipe due to a thermal transfer. It is possible to calculate $R_{pipe}$ and $R_{insulation}$ on the basis of Equation (3) and Equation (4) below, by using thermal conductivities $k_p$ and $k_i$ of the pipe and the heat insulating material, respectively, an outer radius $r_{p2}$ of the pipe (i.e., the inner radius of the heat insulating material), an inner radius $r_{p1}$ of the pipe, an outer radius $r_1$ of the heat insulating material, and a length L of an area that is considered for a thermal transfer in an axial direction of the pipe. In addition, "ln" in Equation is a natural logarithm.

$$R_{pipe} = \frac{\ln(r_{p2}/r_{p1})}{2\pi k_p L} \quad (3)$$

$$R_{insulation} = \frac{\ln(r_i/r_{p2})}{2\pi k_i L} \quad (4)$$

Furthermore, it is possible to calculate $R_{inner}$ by using a heat transfer rate $h_{inner}$ inside the pipe on the basis of Equation (5) below.

$$R_{inner} = \frac{1}{2\pi r_{p1} h_{inner} L} \quad (5)$$

Then, it is possible to calculate an in-pipe fluid temperature $T_{inner}$ on the basis of Equation (6) below by using Equation (1) and Equation (2) above.

$$T_{inner} = T_1 + \frac{R_{pipe} + R_{inner}}{R_{insulation}}(T_1 - T_2) \quad (6)$$

Furthermore, L does not affect the calculation result of Equation (6) above, and may be thus defined as, for example, 1 m or the like. In addition, in the case where an ambient air temperature of the pipe is measured or predicted instead of the heat insulating material surface temperature, it is also possible to estimate the in-pipe fluid temperature in a similar manner, and, in addition, it is possible to estimate an in-pipe fluid temperature in a similar manner even if a pipe does not include a heat insulating material.

Flow of Calculation Process

In the following, an example of the flow of a calculation process for calculating the in-pipe fluid temperature will be described. At a first step, the calculation unit 15b included in the estimation device 10 receives an input of the pipe surface temperature $T_1$ that is the outer surface temperature at the reference position (Step S301). At a second step, the calculation unit 15b receives an input of a heat insulating material surface temperature 12 (Step S302). At a third step, the calculation unit 15b receives an input of $r_{p1}$, $r_{p2}$, $r_i$, and L as the values related to the radius of each of the pipe and the heat insulating material and the length (Step S303). At a fourth step, the calculation unit 15b receives an input of $k_p$, $k_i$, and $h_{inner}$ as the values of the thermal conductivity and the heat transfer rate (Step S304). At a fifth step, the calculation unit 15b outputs $T_{inner}$ as the calculation value of the in-pipe fluid temperature (Step S305).

The calculation unit 15b performs the processes at Steps S301 to S305 described above, and ends the fluid temperature calculation process. Furthermore, the order of the input reception processes performed at Steps S301 to S304 and the timing at which each of the processes is performed are able to be dynamically or statically changed.

4. Flow of Precipitate Thickness Estimation Process

Figure 6:
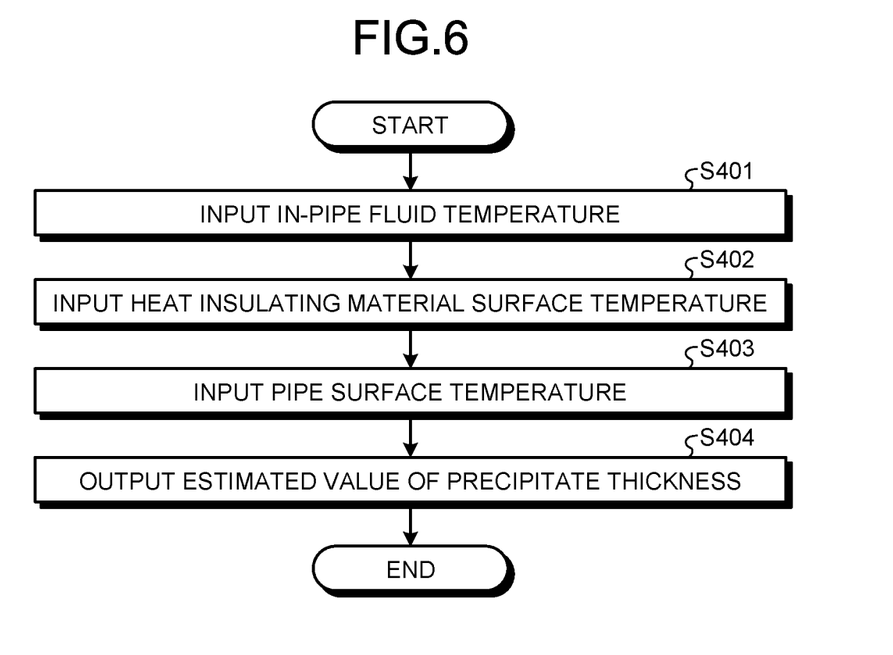
FIG. 6 is a flowchart illustrating an example of the flow of a precipitate thickness estimation process according to one or more embodiments.

The flow of the precipitate thickness estimation process according to one or more embodiments will be described with reference to FIG. 6. FIG. 6 is a flowchart illustrating an example of the flow of the precipitate thickness estimation process according to one or more embodiments. In a description below, the information that is stored in the precipitate thickness database (DB) 70 and that is used for the estimation process according to one or more embodiments will be described, and then, the flow of the precipitate thickness estimation process according to one or more embodiments will be described in detail.

Information Stored in Precipitate Thickness DB 70

The precipitate thickness DB 70 stores therein, for each of the types of precipitate, information in which a surface temperature distribution of the pipe in the circumferential direction is associated with a precipitate thickness distribution that is a thickness distribution of a precipitate in the circumferential direction. The information may be generated from a computer simulation, or may be generated from actual measurement values that are accumulated in advance.

The precipitate thickness DB 70 stores therein a graph that indicates a relationship between the surface temperature and the outer circumference position as the surface temperature distribution of the pipe in the circumferential direction. For example, the precipitate thickness DB 70 stores therein a graph that indicates a plurality of surface temperature distributions at the in-pipe fluid temperature and an external temperature (e.g., an outside air temperature, a heat insulating material surface temperature, an outer pipe fluid temperature, etc.). Furthermore, the precipitate thickness DB 70 stores therein a graph that indicates a relationship between the thickness of the precipitate adhered in the pipe and the outer circumference position as the precipitate thickness distribution. In other words, the precipitate thickness DB 70 stores therein data on a precipitate thickness distribution that is associated with each of the plurality of surface temperature distributions obtained by using the in-pipe fluid temperature and the heat insulating material surface temperature as parameters.

Flow of Estimation Process

In the following, an example of the flow of the estimation process for estimating a precipitate thickness will be described. At a first step, the estimation unit 15c included in the estimation device 10 receives an input of the in-pipe fluid temperature that has been calculated by the calculation unit 15b (Step S401). At a second step, the estimation unit 15c receives an input of the heat insulating material surface temperature (Step S402). At a third step, the estimation unit 15c receives an input of the pipe surface temperature (Step S403). At a fourth step, the estimation unit 15c outputs the estimated value of the precipitate thickness (Step S404).

At this time, the estimation unit 15c searches, the precipitate thickness DB 70, for a surface temperature distribution in which the value of the surface temperature is most matched by using the calculated in-pipe fluid temperature and the heat insulating material surface temperature as keys. Then, the estimation unit 15c estimates a thickness of the precipitate 60 on the basis of the precipitate thickness distribution that is associated with the searched surface temperature distribution.

The estimation unit 15c performs the processes at Steps S401 to S404 described above, and ends the precipitate thickness estimation process. Furthermore, the order of the input reception processes performed at Steps S401 to S403 and the timing at which each of the processes is performed are able to be dynamically or statically changed.

Specific Example of Pipe and Temperature Sensor

A specific example of disposition of the pipe and the temperature sensors and the use of the pipe and the temperature sensors will be described with reference to FIG. 7 to FIG. 10. In specific examples 1 to 3, the estimation process on the pipe in which a generation position of a precipitate is clear will be described, and in the specific example 4, the estimation process on the pipe in which a generation position of a precipitate is unclear will be described. Furthermore, the pipe illustrated in FIG. 7 to FIG. 10 is a pipe covered by a heat insulating material; however, the pipe may also be a pipe without a heat insulating material, or it may also correct the influence of an ambient environment by increasing the number of measurement points on a surface or an inside of a heat insulating material.

Specific Example 1

Figure 7:
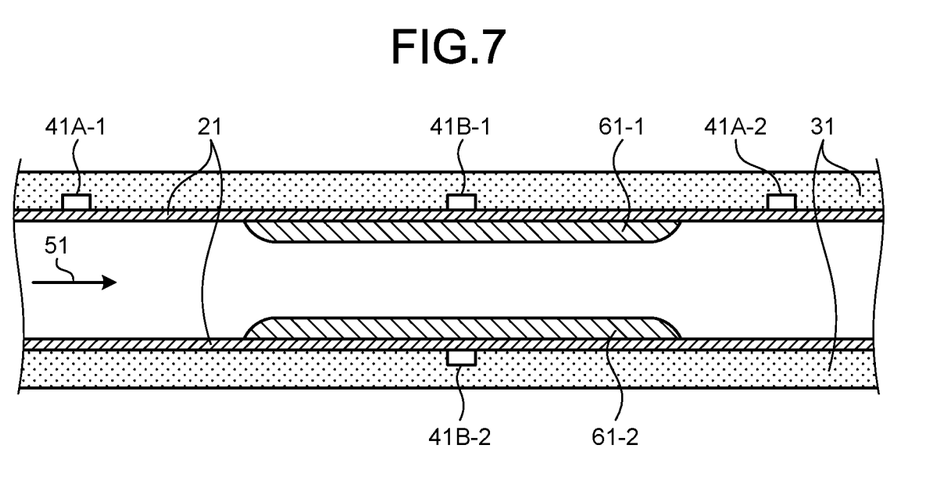
FIG. 7 is a diagram illustrating a specific example 1 of a pipe and temperature sensors according to one or more embodiments.

An estimation process performed on the pipe in which a generation position of a precipitate is clear will be described with reference to FIG. 7. FIG. 7 is a diagram illustrating the specific example 1 of a pipe and temperature sensors according to one or more embodiments. Furthermore, FIG. 7 is a diagram illustrating a cross-sectional view of a pipe 21 that is covered by a heat insulating material 31, and in which precipitates 61-1 and 61-2 are adhered near the center of the pipe 21 at an upper part and a lower part of the pipe 21 caused by a flow of a fluid 51.

As illustrated in FIG. 7, if it is realized that a precipitate is adhered to only a part of a pipe, the estimation device 10 is able to estimate an in-pipe fluid temperature by measuring a temperature of a point, in which a precipitate is not adhered, at a position on the upstream or the downstream side of the part of the pipe in which a precipitate is adhered. In other words, the estimation device 10 acquires a temperature measured by a temperature sensor 41A-1 as the pipe surface temperature of a reference position located on the upstream side, and acquires a temperature measured by a temperature sensor 41A-2 as the pipe surface temperature of a reference position located on the downstream side. In contrast, the estimation device 10 acquires a temperature measured by each of temperature sensors 41B-1 and 41B-2 as the pipe surface temperature at the precipitate generation position. Furthermore, the cause of a precipitate generated at only a part of the pipe may possibly be a difference in ambient environment of the pipe, a difference in pipe diameter, a difference in in-pipe fluid temperature.

Specific Example 2

Figure 8:
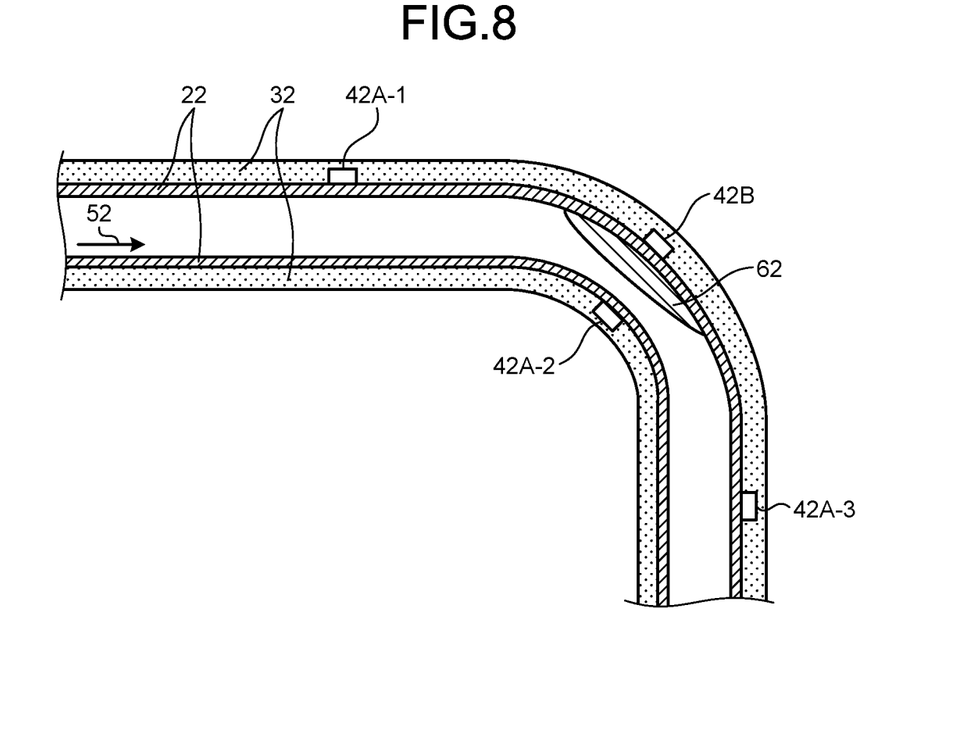
FIG. 8 is a diagram illustrating a specific example 2 of a pipe and temperature sensors according to one or more embodiments.

An estimation process performed on the pipe in which a generation position of a precipitate is clear will be described with reference to FIG. 8. FIG. 8 is a diagram illustrating the specific example 2 of a pipe and temperature sensors according to one or more embodiments. Furthermore, FIG. 8 is a diagram illustrating a cross-sectional view of a pipe 22 that is covered by a heat insulating material 32, and in which a precipitate 62 is adhered to an upper part of an elbow portion of the pipe 22 caused by a flow of a fluid 52.

As illustrated in FIG. 8, if it is realized that a precipitate is adhered to only a part of a pipe, the estimation device 10 is able to estimate, similarly to FIG. 7, an in-pipe fluid temperature by measuring a temperature of a point, in which a precipitate is not adhered, at a position on the upstream or the downstream side of the part of the pipe in which a precipitate is adhered. In other words, the estimation device 10 acquires a temperature measured by a temperature sensor 42A-1 as a pipe surface temperature of a reference position located on the upstream side, and acquires a temperature measured by a temperature sensor 42A-3 as the pipe surface temperature of a reference position located on the downstream side. Furthermore, if the precipitate 62 is adhered to only an upper part of the pipe, the estimation device 10 may acquire the temperature measured by a temperature sensor 42A-2 as a pipe surface temperature at a position that is opposite the position in which the precipitate 62 is adhered. In contrast, the estimation device 10 acquires the temperature measured by a temperature sensor 42B as the pipe surface temperature of the precipitate generation position.

Specific Example 3

Figure 9:
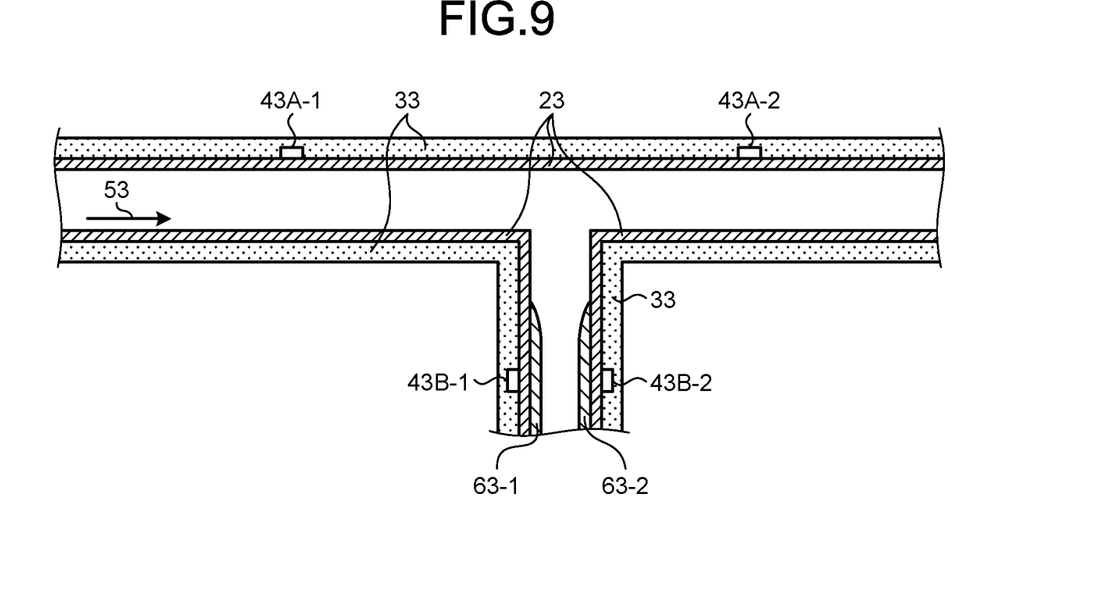
FIG. 9 is a diagram illustrating a specific example 3 of a pipe and temperature sensors according to one or more embodiments.

An estimation process performed on the pipe in which a generation position of a precipitate is clear will be described with reference to FIG. 9. FIG. 9 is a diagram illustrating the specific example 3 of a pipe and temperature sensors according to one or more embodiments. Furthermore, FIG. 9 is a diagram illustrating a cross-sectional view of a pipe 23 that is covered by a heat insulating material 33, and in which precipitates 63-1 and 63-2 are adhered to a branch portion of the pipe 23 caused by a flow of a fluid 53.

As illustrated in FIG. 9, if it is realized that a precipitate is adhered to only a part of a pipe, the estimation device 10 may measure a pipe surface temperature of the root of the branch portion or another branch destination. In other words, the estimation device 10 acquires a temperature measured by a temperature sensor 43A-1 as the pipe surface temperature of a reference position located at the root of the branch portion, and acquires a temperature measured by a temperature sensor 43A-2 as the pipe surface temperature of a reference position located at another branch destination. In contrast, the estimation device 10 acquires a temperature measured by each temperature sensors 43B-1 and 43B-2 as the pipe surface temperature of the precipitate generation position.

Specific Example 4

Figure 10:
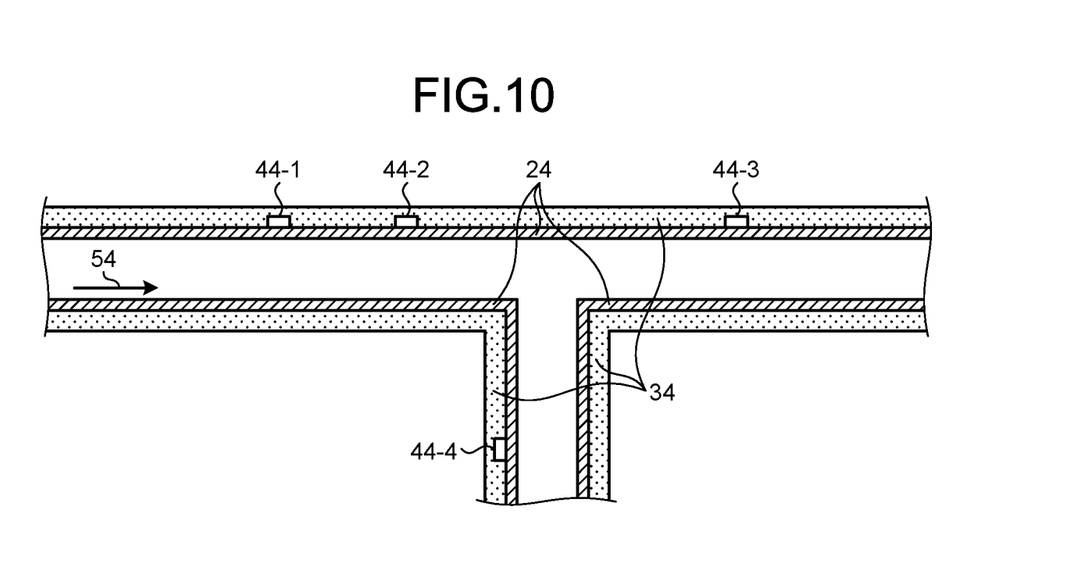
FIG. 10 is a diagram illustrating a specific example 4 of a pipe and temperature sensors according to one or more embodiments.

An estimation process performed on the pipe in which a generation position of a precipitate is unclear will be described with reference to FIG. 10. FIG. 10 is a diagram illustrating the specific example 4 of a pipe and temperature sensors according to one or more embodiments. Furthermore, FIG. 10 is a diagram illustrating a cross-sectional view of a pipe 24 that is covered by a heat insulating material 34, and in which a generation position of a precipitate is unclear even though a fluid 54 flows.

At this time, if each of the measurement position are separated each other and a difference in fluid temperature at each position is large, the estimation device 10 estimates a fluid temperature based on the assumption that a precipitate is not present at each of the positions by using Equation (6) that is a calculation expression of the in-pipe fluid temperature as described above. In other words, the estimation device 10 defines, by taking into account a fluid temperature difference or a temporal difference for each position, a measurement position, in which a highest temperature is able to be obtained as an estimated value of a fluid temperature at a certain reference position, as a position without a precipitate, and uses the estimated value of the fluid temperature obtained from the measurement value at the defined measurement position in order to estimate a precipitate thickness at the other measurement position.

In FIG. 10, surface temperatures in the pipe at four points associated with temperature sensors 44-1, 44-2, 44-3, and 44-4 are measured. For example, the point associated with the temperature sensor 44-1 is defined as a reference point (another point may be possible). Then, time $\delta t_{2-1}$, $\delta t_{3-1}$, and $\delta t_{4-1}$ needed for the fluid 54 to flow from the point associated with the temperature sensor 44-1 to the point associated with the temperature sensor 44-2, the point associated with the temperature sensor 44-3, and the point associated with the temperature sensor 44-4, respectively, are obtained on the basis of the distance between the measurement points and the flow velocity. Here, estimated values that are related to the in-pipe fluid temperatures at the respective positions and that are estimated from the pipe surface temperatures at the four points associated with the temperature sensors 44-1 to 44-4 at time t on the basis of the assumption that a precipitate is not adhered to each of the positions are denoted by Ti1(t), Ti2(t), Ti3(t), and Ti4(t), respectively. As a result, if a fluid temperature at the point associated with the temperature sensor 44-1 at certain time to is estimated from the pipe surface temperatures at the points associated with the temperature sensors 44-1 to 44-4, Ti1($t_0$), Ti2 ($t_0+\delta t_{2-1}$), Ti3($t_0+\delta t_{3-1}$), and Ti4 ($t_0+\delta t_{4-1}$), respectively, are obtained. Then, if it is assumed that a precipitate is not adhered to the point in which the highest temperature is obtained from among the estimated temperatures, the in-pipe fluid temperature is estimated from that point and the estimated in-pipe fluid temperature is used to estimate a precipitate thickness of other points. Therefore, if a precipitate is not adhered to at least one position from among the four points that are associated with the temperature sensors 44-1 to 44-4, it is possible to estimate a precipitate thickness by using this method.

Effects of Embodiments

Firstly, in the process according to one or more embodiments described above, the first pipe surface temperature that is the outer surface temperature of the pipe 20 at the precipitate generation position at which the precipitate 60 is adhered to the inner surface of the pipe 20 through which the fluid 50 flows and the second pipe surface temperature that is the outer surface temperature of the pipe 20 at the reference position that is different from the precipitate generation position are acquired, the in-pipe fluid temperature that is the temperature of the fluid 50 at the precipitate generation position is calculated on the basis of the acquired second pipe surface temperature, and the information on the thickness of the precipitate 60 is estimated on the basis of the calculated in-pipe fluid temperature and the acquired first pipe surface temperature. As a result, in this process, it is possible to estimate the precipitate thickness inside the pipe with accuracy.

Secondly, in the process according to one or more embodiments described above, the outer surface temperature of the pipe 20 at the reference position at which the precipitate 60 is not adhered to the inner surface of the pipe is acquired as the second pipe surface temperature, and the thickness of the precipitate 60 at the precipitate generation position is estimated. As a result, in this process, it is possible to estimate, with accuracy, the precipitate thickness inside the pipe by using the information on the reference position at which a precipitate is not adhered.

Thirdly, in the process according to one or more embodiments described above, the outer surface temperature of the pipe 20 at the reference position at which the precipitate 60 is adhered to the inner surface of the pipe is acquired as the second pie surface temperature, and a difference between the thickness of the precipitate 60 at the reference position and the thickness of the precipitate at the precipitate generation position is estimated. As a result, in this process, it is possible to estimate, with accuracy, the difference between the precipitate thicknesses inside the pipe by using the information on the reference position at which the precipitate is adhered.

Fourthly, in the process according to one or more embodiments described above, a heat insulating material surface temperature that is the outer surface temperature of the heat insulating material 30 that covers the pipe 20 is further acquired, an in-pipe fluid temperature is calculated by using the second pipe surface temperature, the heat insulating material surface temperature, and the thermal resistance of each of the fluid 50, the pipe 20, and the heat insulating material 30, and then, the thickness of the precipitate 60 at the precipitate generation position is estimated by using the thickness distribution of the precipitates that are associated with each of the in-pipe fluid temperature and first pipe surface temperature. As a result, in this process, it is possible to estimate, with accuracy, the precipitate thickness inside the pipe in a non-invasive manner.

Fifthly, in the process according to one or more embodiments described above, a temperature difference between the fluid 50 flowing through the reference position and the fluid 50 flowing through the precipitate generation position is calculated by using the temperature of the fluid 50 at the precipitate generation position, the flow velocity of the fluid 50 inside the pipe 20, and a distance between the reference position and the precipitate generation position in a state in which the precipitate 60 is not adhered, and an in-pipe fluid temperature is calculated by using the calculated temperature difference. As a result, in this process, it is possible to calculate, with accuracy, the in-pipe fluid temperature and estimate, with accuracy, the precipitate thickness inside the pipe.

Sixthly, in the process according to one or more embodiments described above, when the second pipe surface temperature is acquired from the plurality of reference positions, the in-pipe fluid temperature is calculated on the basis of the second pipe surface temperature that is acquired from the reference position in which a highest outer surface temperature is indicated. As a result, in this process, it is possible to estimate, with accuracy, the precipitate thickness inside the pipe even if the position at which a precipitate is not adhered is unclear.

Seventhly, in the process according to one or more embodiments described above, the first pipe surface temperature and the second pipe surface temperature inside the pipe 20 that transports oil or gas produced from a winze are acquired, an in-pipe fluid temperature of the oil or the gas is calculated on the basis of the second pipe surface temperature, and then, the information on the thickness of hydrate, wax, asphaltene, or scale is estimated on the basis of the in-pipe fluid temperature and the first pipe surface temperature. As a result, in this process, it is possible to estimate, with accuracy, the precipitate thickness inside the pipe in a pipeline that is used for oil or gas.

System

The flow of the processes, the control procedures, the specific names, and the information containing various kinds of data or parameters indicated in the above specification and drawings can be arbitrarily changed unless otherwise stated.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, all or any part of each of the processing functions performed by the each of the devices can be implemented by a CPU and by programs (instructions) analyzed and executed by the CPU or implemented as hardware by wired logic.

Hardware

Figure 11:
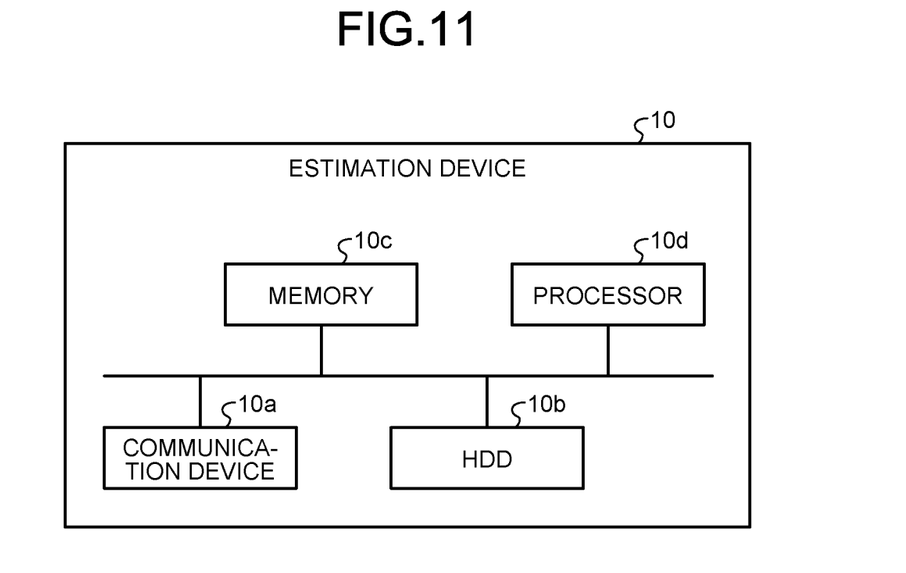
FIG. 11 is a diagram illustrating an example of a hardware configuration according to one or more embodiments.

In the following, an example of a hardware configuration of the estimation device 10 will be described. Furthermore, the same hardware configuration may be used for the other devices. FIG. 11 is a diagram illustrating an example of a hardware configuration. As illustrated in FIG. 11, the estimation device 10 includes a communication device 10a, a hard disk drive (HDD) 10b, a memory 10c, and a processor 10d. Furthermore, each of the units illustrated in FIG. 11 is connected by a bus or the like with each other.

The communication device 10a is a network interface card or the like, and communicates with another server. The HDD 10b stores therein the programs and the DBs that operate the functions illustrated in FIG. 2.

The processor 10d operates the process that executes each of the functions described above in FIG. 2 or the like by reading the programs that execute the same process as that performed by each of the processing units illustrated in FIG. 2 from the HDD 10b or the like and loading the read programs in the memory 10c. For example, the process executes the same functions as those performed by each of the processing units included in the estimation device 10. Specifically, the processor 10d reads, from the HDD 10b or the like, the programs having the same functions as those performed by the acquisition unit 15a, the calculation unit 15b, the estimation unit 15c, and the like. Then, the processor 10d executes the process for executing the same processes as those performed by the acquisition unit 15a, the calculation unit 15b, the estimation unit 15c, and the like.

In this way, the estimation device 10 is operated as an information processing apparatus that performs various processing methods by reading and executing the programs. Furthermore, the estimation device 10 is also able to implement the same functions as those described above in one or more embodiments by reading the above described programs from a recording medium by a medium reading device and executing the read programs. Furthermore, the programs described in other embodiments are not limited to be executed by the estimation device 10. For example, the programs described in other embodiments are not limited to be executed by the information processing apparatus 10. For example, the above embodiments may also be similarly used in a case in which another computer or a server executes a program or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

One or more embodiments can estimate a precipitate thickness in a pipe with accuracy.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An estimation device comprising a controller that:
   acquires a first pipe surface temperature and a second pipe surface temperature, wherein the first pipe surface temperature is an outer surface temperature of a pipe at a precipitate generation position at which a precipitate is adhered to an inner surface of the pipe through which a fluid flows, and the second pipe surface temperature is the outer surface temperature of the pipe at a reference position different from the precipitate generation position,
   calculates an in-pipe fluid temperature that is a temperature of the fluid at the precipitate generation position based on the second pipe surface temperature,
   estimates a thickness of the precipitate based on the in-pipe fluid temperature and the first pipe surface temperature, and
   in a case where the precipitate is adhered to the inner surface at the reference position, further estimates a difference between the thickness of the precipitate at the reference position and the thickness of the precipitate at the precipitate generation position.

2. The estimation device according to claim 1, wherein the controller:
   acquires the first pipe surface temperature and the second pipe surface temperature with respect to the pipe transporting oil or gas produced from a winze,
   calculates the in-pipe fluid temperature of the oil or the gas based on the second pipe surface temperature, and
   estimates a thickness of hydrate, wax, asphaltene, or scale based on the in-pipe fluid temperature and the first pipe surface temperature.

3. The estimation device according to claim 1, wherein, when the controller acquires the second pipe surface temperature from reference positions of the pipe different from the precipitate generation position, the controller further calculates the in-pipe fluid temperature based on the second pipe surface temperature that is acquired from one of the reference positions in which a highest outer surface temperature is indicated.

4. The estimation device according to claim 3, wherein the controller:

acquires the first pipe surface temperature and the second pipe surface temperature with respect to the pipe that transports oil or gas produced from a winze, calculates the in-pipe fluid temperature of the oil or the gas based on the second pipe surface temperature, and estimates a thickness of hydrate, wax, asphaltene, or scale based on the in-pipe fluid temperature and the first pipe surface temperature.

5. The estimation device according to claim 1, wherein the controller further calculates:

a temperature difference between the fluid flowing through the reference position and the fluid flowing through the precipitate generation position based on the temperature of the fluid at the precipitate generation position where the precipitate is not adhered, a flow velocity of the fluid inside the pipe, and a distance between the reference position and the precipitate generation position, and the in-pipe fluid temperature based on the temperature difference.

6. The estimation device according to claim 5, wherein the controller:

acquires the first pipe surface temperature and the second pipe surface temperature with respect to the pipe that transports oil or gas produced from a winze, calculates the in-pipe fluid temperature of the oil or the gas based on the second pipe surface temperature, and estimates a thickness of hydrate, wax, asphaltene, or scale based on the in-pipe fluid temperature and the first pipe surface temperature.

7. The estimation device according to claim 5, wherein, when the controller acquires the second pipe surface temperature from reference positions of the pipe different from the precipitate generation position, the controller further calculates the in-pipe fluid temperature based on the second pipe surface temperature that is acquired from one of the reference positions in which a highest outer surface temperature is indicated.

8. The estimation device according to claim 7, wherein the controller:

acquires the first pipe surface temperature and the second pipe surface temperature with respect to the pipe that transports oil or gas produced from a winze, calculates the in-pipe fluid temperature of the oil or the gas based on the second pipe surface temperature, and estimates a thickness of hydrate, wax, asphaltene, or scale based on the in-pipe fluid temperature and the first pipe surface temperature.

9. An estimation device comprising a controller that:

acquires a first pipe surface temperature and a second pipe surface temperature, wherein the first pipe surface temperature is an outer surface temperature of a pipe at a precipitate generation position at which a precipitate is adhered to an inner surface of the pipe through which a fluid flows, and the second pipe surface temperature is the outer surface temperature of the pipe at a reference position different from the precipitate generation position, calculates an in-pipe fluid temperature that is a temperature of the fluid at the precipitate generation position based on the second pipe surface temperature, estimates a thickness of the precipitate based on the in-pipe fluid temperature and the first pipe surface temperature, further acquires a heat insulating material surface temperature that is an outer surface temperature of a heat insulating material that covers the pipe, further calculates the in-pipe fluid temperature based on the second pipe surface temperature, the heat insulating material surface temperature, and thermal resistance of each of the fluid, the pipe, and the heat insulating material, and further estimates the thickness of the precipitate at the precipitate generation position based on a thickness distribution of the precipitates that are associated with the in-pipe fluid temperature and the first pipe surface temperature.

10. The estimation device according to claim 9, wherein the controller:

acquires the first pipe surface temperature and the second pipe surface temperature with respect to the pipe that transports oil or gas produced from a winze, calculates the in-pipe fluid temperature of the oil or the gas based on the second pipe surface temperature, and estimates a thickness of hydrate, wax, asphaltene, or scale based on the in-pipe fluid temperature and the first pipe surface temperature.

11. The estimation device according to claim 9, wherein, when the controller acquires the second pipe surface temperature from reference positions of the pipe different from the precipitate generation position, the controller further calculates the in-pipe fluid temperature based on the second pipe surface temperature that is acquired from one of the reference positions in which a highest outer surface temperature is indicated.

12. The estimation device according to claim 11, wherein the controller:

acquires the first pipe surface temperature and the second pipe surface temperature with respect to the pipe that transports oil or gas produced from a winze, calculates the in-pipe fluid temperature of the oil or the gas based on the second pipe surface temperature, and estimates a thickness of hydrate, wax, asphaltene, or scale based on the in-pipe fluid temperature and the first pipe surface temperature.

13. The estimation device according to claim 9, wherein the controller further calculates:

a temperature difference between the fluid flowing through the reference position and the fluid flowing through the precipitate generation position based on the temperature of the fluid at the precipitate generation position where the precipitate is not adhered, a flow velocity of the fluid inside the pipe, and a distance between the reference position and the precipitate generation position, and the in-pipe fluid temperature based on the temperature difference.

14. The estimation device according to claim 13, wherein the controller:

acquires the first pipe surface temperature and the second pipe surface temperature with respect to the pipe that transports oil or gas produced from a winze, calculates the in-pipe fluid temperature of the oil or the gas based on the second pipe surface temperature, and estimates a thickness of hydrate, wax, asphaltene, or scale based on the in-pipe fluid temperature and the first pipe surface temperature.

15. The estimation device according to claim 13, wherein, when the controller acquires the second pipe surface temperature from reference positions of the pipe different from the precipitate generation position, the controller further calculates the in-pipe fluid temperature based on the second pipe surface temperature that is acquired from one of the reference positions in which a highest outer surface temperature is indicated.

16. The estimation device according to claim 15, wherein the controller:
   acquires the first pipe surface temperature and the second pipe surface temperature with respect to the pipe that transports oil or gas produced from a winze,
   calculates the in-pipe fluid temperature of the oil or the gas based on the second pipe surface temperature, and
   estimates a thickness of hydrate, wax, asphaltene, or scale based on the in-pipe fluid temperature and the first pipe surface temperature.

17. An estimation method comprising:
   acquiring a first pipe surface temperature and a second pipe surface temperature, wherein the first pipe surface temperature is an outer surface temperature of a pipe at a precipitate generation position at which a precipitate is adhered to an inner surface of the pipe through which a fluid flows, and the second pipe surface temperature is the outer surface temperature of the pipe at a reference position different from the precipitate generation position;
   calculating an in-pipe fluid temperature that is a temperature of the fluid at the precipitate generation position based on the second pipe surface temperature;
   estimating a thickness of the precipitate based on the in-pipe fluid temperature and the first pipe surface temperature;
   further acquiring a heat insulating material surface temperature that is an outer surface temperature of a heat insulating material that covers the pipe;
   further calculating the in-pipe fluid temperature based on the second pipe surface temperature, the heat insulating material surface temperature, and thermal resistance of each of the fluid, the pipe, and the heat insulating material; and
   further estimating the thickness of the precipitate at the precipitate generation position based on a thickness distribution of the precipitates that are associated with the in-pipe fluid temperature and the first pipe surface temperature.

* * * * *